Figure 1:
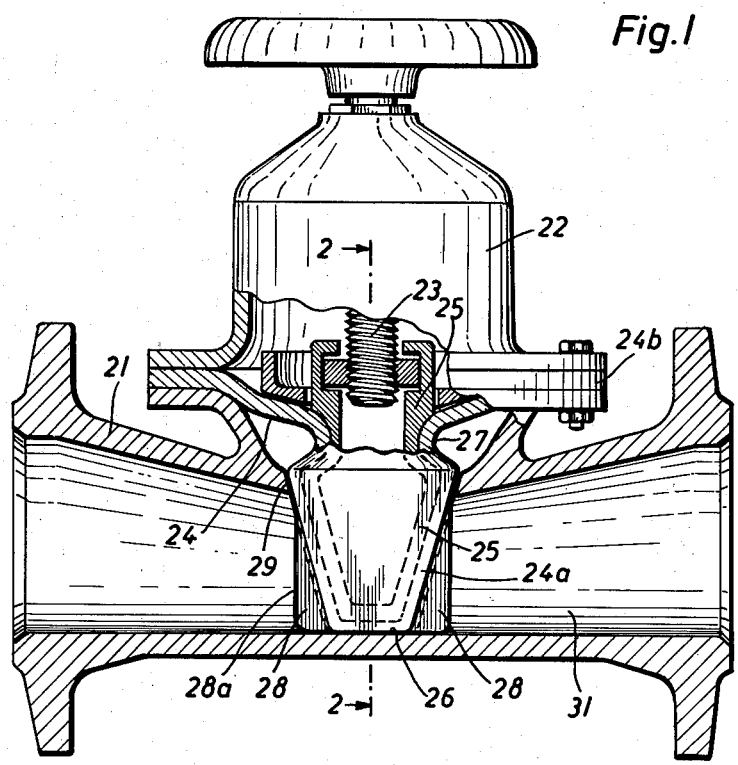

Dec. 13, 1960 — F. SCHMITZ — 2,964,289
DIAPHRAGM SLIDE VALVE
Filed July 22, 1958 — 2 Sheets-Sheet 1

INVENTOR
F. Schmitz

Dec. 13, 1960  F. SCHMITZ  2,964,289
DIAPHRAGM SLIDE VALVE
Filed July 22, 1958  2 Sheets-Sheet 2
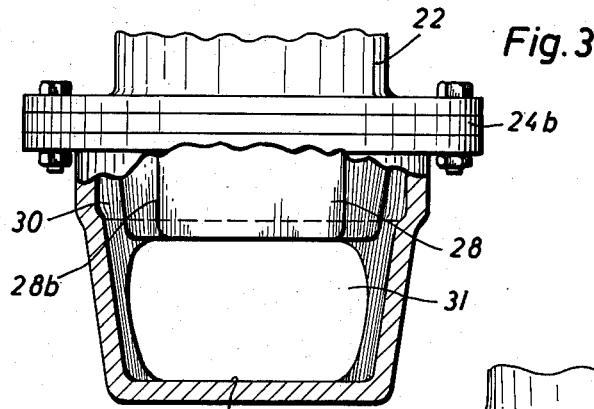
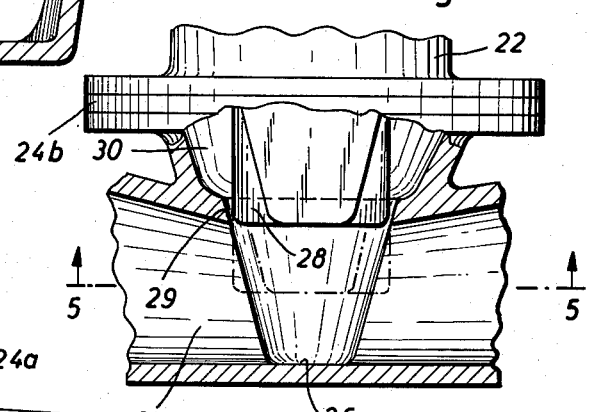
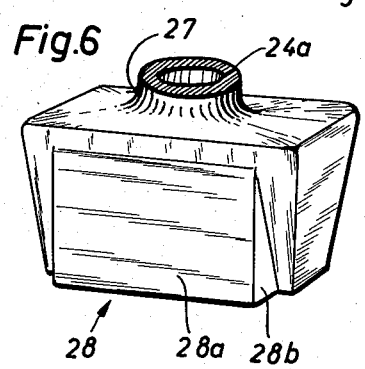
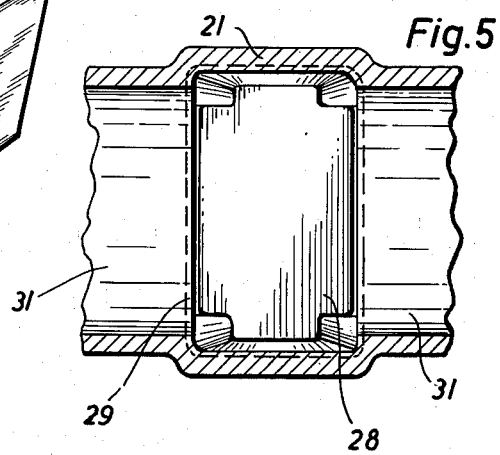
INVENTOR
F. Schmitz
BY

United States Patent Office 2,964,289
Patented Dec. 13, 1960

2,964,289

DIAPHRAGM SLIDE VALVE

Friedrich Schmitz, 96 Morbacher Strasse,
Cologne, Germany

Filed July 22, 1958, Ser. No. 750,183

Claims priority, application Germany July 23, 1957

2 Claims. (Cl. 251—175)

This invention relates to a slide valve with a spindle seal formed by a diaphragm arranged transverse to the axis of the spindle and fixed in the casing.

There are slide valves provided with a closing member which is covered by the diaphragm whose edge is fixed into the casing. Above the largest cross-section of the diaphragm projection, the closing member may be provided with a contraction. An advantageous embodiment of the closing member consists therein that its cross-section transverse to the stroke is shorter in the one direction as, for instance, in the direction of passage than in the transverse direction. It is also known to shape the closing member like a pyramid which tapers in the closing direction and which may be truncated with a flat surface at the bottom.

Slide valves of this latter kind with a closing member shaped like a truncated pyramid have many advantages. The pyramidal closing member covered by the diaphragm permits perfect sealing by the flat surface in the closed position of the slide valve. The contact surfaces are made effective simultaneously. An overstressing of the diaphragm projection is prevented. The bottom of the truncated pyramid provides an excellent guide for the passing medium and the pyramid with a cross-section smaller in the direction of passage than in the transverse direction renders possible shorter total lengths of the valve casing which is particularly important for large dimensioned casings.

This invention relates to a further deevlopment of a slide valve with a closing member shaped like a truncated pyramid and covered by a diaphragm. The essential feature of the invention consists therein that the pyramidal closing member is enlarged at the longitudinal sides towards the contacting surface. The external zones of the longitudinal sides of the pyramidal closing member are preferably exempt from the enlargement. The enlargement suitably begins below the upper pyramidal sealing surface extending around the casing and extends to the flat contacting surface at the bottom. The side surfaces forming the enlargement may extend parallel to the axis of the spindle but may also taper towards the flat contacting surface at the bottom of the closing member.

Another object of the invention is to form the closing member of hexagon shape in cross-section but with narrow front sides. These front sides may be flat or rounded. The front sides of the closing member may extend in vertical direction or obliquely to the flat contacting surface at the bottom of the closing member.

In a further embodiment of the invention, channels are provided for the closing member along the sealing lines between the core of the closing member and the diaphragm projection. These channels are kept under pressure by means of a pressure medium. In this manner, an additional sealing may be obtained along the sealing lines of the pyramidal closing member. This applies especially to slide valves of large dimensions. Thereby the necessity of exerting excessive spindle pressures is avoided. The closing of slide valves of large dimensions may also be effected by hand.

Figure 2:
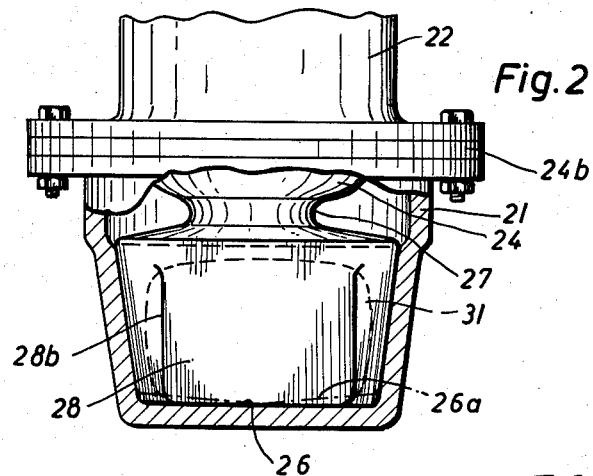

In the drawings are illustrated by way of example two embodiments of the object of the invention, in which:

Fig. 1 is a part-sectional view of the casing of the slide valve with the closing member, Fig. 2 is a cross-section on the line 2—2 of Fig. 1, Fig. 3 is a similar cross-section with the closing member partly raised, Fig. 4 corresponds to Fig. 1 and shows the closing member completely raised for opening of the passage, Fig. 5 is a cross-section on the line 5—5 of Fig. 4 seen from below, and Fig. 6 shows a perspective view of the closing member.

In the form of invention shown in Figs. 1 to 6, the slide valve consists of the lower part 21 and the upper part 22 of the casing in which is guided the threaded spindle 23. The diaphragm 24 is fixed between the lower part 21 and the upper part 22 of the casing. The closing member is formed as a projection of the diaphragm 24 and consists of a core 25 which is preferably hollow as shown in Fig. 1. This core is covered by the projection 24a of the diaphragm. The core or closing member 25 and the diaphragm part 24a may be moved by actuating the spindle 23 in longitudinal direction with the diaphragm 24 moved therewith.

The closing member 25 is shaped like a truncated pyramid with a flat or nearly flat bottom surface 26. The closing member covered by the diaphragm is of substantially rectangular shape in horizontal cross-section and is suitably provided with a contracted neck 27 of circular cross-section which is likewise covered by the diaphragm. The fixed edge 24b of the diaphragm is likewise circular while the closing members cross-section transverse to the stroke is shorter in the one direction as, for instance, in the direction of passage than in the transverse direction.

According to the invention, this pyramidal closing member 25 is provided at the longitudinal sides with enlargements 28 which begin below the pyramidal sealing surfaces 29 extending around the casing, and extend to the flat contacting surface 26 at the bottom. The longitudinal sides 28a of these enlargements 28 may extend parallel to the central longitudinal plane of the closing member as in Fig. 1. The longitudinal sides 28a may also be arranged obliquely relative to this plane as in Fig. 6. The side faces 28b of the enlargements 28 may also extend in vertical direction or obliquely to the contacting surface 26. Fig. 4 illustrates how the opening between the sealing surfaces 29 is closed by the closing member 25 according to the invention if the same is in the raised position. There is effected a nearly complete closure against entry of the medium into the dead space 30. With the closing member 25 in the raised position, the flowing medium is given a smooth and excellent guidance in the passage 31 from one end of the casing to the other end thereof.

The contacting surface 26 at the bottom may be slightly curved in the longitudinal direction of the closing member as indicated by lines 26a in Fig. 2. The counter surface of the casing is then likewise slightly curved.

The enlargements 28 may be formed from the material of the diaphragm projection 24a. But these enlargements may also be formed from the material of the core 25 of the closing member so that the diaphragm covering this core has at all places the same thickness.

What is claimed is:

1. A valve comprising a casing including a through passage, a valve chamber intersecting said through passage and terminating in a lower flat surface coinciding with said through passage, a housing on said casing overlying said valve chamber, valve-element actuating means mounted on said housing, a valve element connected to said valve-element actuating means and including a sealing portion movable in intersecting relation to said through passage in said valve chamber for controlling fluid flow therethrough, and a flexible diaphragm disposed transversely beneath said housing and including a central portion substantially covering and conforming to the sealing portion of said valve element, said valve chamber including a downwardly converging rectangular valve seat overlying said through passage, said valve chamber including inwardly converging side portions coplanar with opposite sides of said valve seat and intersecting the said lower flat surface of said chamber, said valve element comprising an inverted, truncated pyramid peripherally engageable at an upper portion on said seat and having opposite sides sealingly engageable on said opposite converging side portions, said valve element including a flat bottom portion sealingly engageable on said lower flat surface of said chamber, said valve element including at least one enlargement projecting from one side of said valve element in the direction from which fluid will flow through said through passage, said enlargement comprising a bottom portion coinciding with that of the valve element and a side surface normal to the bottom portion and intersecting the side of said valve element below the portion thereof engageable on said valve seat, the enlargement having a width substantially equal to that of said through passage.

2. The structure of claim 1; said valve element including a second enlargement similar to said one enlargement and projecting from the other side of said valve element, the side surfaces of said enlargements guidingly engaging opposite sides of said valve seat for guiding the valve element during reciprocation in said valve chamber.

References Cited in the file of this patent
UNITED STATES PATENTS

| | | |
|---|---|---|
| 2,290,251 | Saunders | July 21, 1942 |
| 2,420,849 | Wilson | May 20, 1947 |
| 2,776,105 | Schmitz | Jan. 1, 1957 |

FOREIGN PATENTS

| | | |
|---|---|---|
| 724,308 | Germany | Aug. 22, 1942 |
| 515,632 | Belgium | Dec. 15, 1952 |
| 293,761 | Switzerland | Jan. 4, 1954 |
| 902,924 | Germany | Jan. 28, 1954 |
| 731,895 | Great Britain | June 15, 1955 |